United States Patent
Riley et al.

(10) Patent No.: US 11,761,567 B2
(45) Date of Patent: Sep. 19, 2023

(54) METHOD OF PROTECTING END FITTINGS OF A HOSE OR TUBE

(71) Applicant: Ultra Clean Technologies Corp., Bridgeton, NJ (US)

(72) Inventors: Bruce Riley, Millville, NJ (US); Jeffrey T. Contino, Jr., Bridgeton, NJ (US); Christopher J. Rohde, Tamaqua, PA (US)

(73) Assignee: Ultra Clean Technologies Corp., Bridgeton, NJ (US)

( * ) Notice: Subject to any disclaimer, the term of this patent is extended or adjusted under 35 U.S.C. 154(b) by 287 days.

(21) Appl. No.: 17/404,476

(22) Filed: Aug. 17, 2021

(65) Prior Publication Data
US 2023/0056805 A1    Feb. 23, 2023

(51) Int. Cl.
*F16L 35/00*    (2006.01)

(52) U.S. Cl.
CPC .................................... *F16L 35/00* (2013.01)

(58) Field of Classification Search
CPC .... F16L 57/00; F16L 57/005; Y10T 29/49865
USPC ......... 138/96 R, 96 T; 174/DIG. 8; 428/34.9, 428/35.1
See application file for complete search history.

(56) References Cited

U.S. PATENT DOCUMENTS

| | | | | |
|---|---|---|---|---|
| 3,906,070 A | * | 9/1975 | Lajovic | B29C 63/423 264/249 |
| 4,297,155 A | * | 10/1981 | Jervis | B29C 61/0608 138/104 |
| 4,386,984 A | * | 6/1983 | Jervis | B29C 61/0608 174/74 A |
| 4,717,608 A | * | 1/1988 | Meltsch | H02G 15/04 174/74 A |
| 4,757,595 A | * | 7/1988 | Fraering, Jr. | B65D 59/00 29/458 |
| 5,127,678 A | * | 7/1992 | Henning | F16L 57/005 285/38 |
| 5,145,283 A | * | 9/1992 | Gowen | B65D 59/00 405/184.5 |
| 5,183,299 A | * | 2/1993 | Hallerstrom | B29C 44/1295 285/47 |
| 5,439,031 A | * | 8/1995 | Steele | F16L 55/1116 264/515 |
| 7,735,525 B2 | * | 6/2010 | Lunsford | G01N 30/54 138/109 |
| 2018/0169933 A1 | * | 6/2018 | LaPorte | F16L 57/00 |

* cited by examiner

*Primary Examiner* — Patrick F Brinson
(74) *Attorney, Agent, or Firm* — Norman E. Lehrer

(57) ABSTRACT

A method of protecting the end fittings of a tube or hose includes the steps of providing an end fitting that is attached to a hose or tube. Providing a heat shrinkable plastic capsule having a tubular portion with an open end and a closed end. Placing the plastic capsule over the end fitting until the closed end of the capsule is in contact with end of the fitting. Placing a magnet at the outer face of the capsule to maintain the end of the capsule in contact with the end of the fitting and heat shrinking the capsule onto the fitting. Removing the magnet from the end of the capsuled fitting.

4 Claims, 3 Drawing Sheets

METHOD OF PROTECTING END FITTINGS OF A HOSE OR TUBE

TECHNICAL FIELD

The present invention is directed toward a method of effectively protecting the end fittings of hoses or tubes and primarily those used in industrial applications.

BACKGROUND ART

Hoses and tubes are used extensively in numerous industrial applications. These hoses or tube are used to conduct air or other gases or various liquids between different apparatus or onto various workpieces. These hoses or tubes are also frequently cleaned by forcing projectiles through them using air or other gases or fluids.

In all cases, the hoses or tubes must be connected to fluid sources. This requires fittings or attachments secured to the ends of the tubes that connect the tubes or hoses to the various pieces of equipment. Such fittings are appropriately referred to as end fittings and are primarily made of metal and most commonly of various grades of steel.

When tubes or hoses are not being used, they are frequently removed from the apparatus by disconnecting their end fittings from the equipment. To prevent damage to or contamination of the end fittings, it is known to cover or wrap them with plastic. This is also frequently done with new hoses or tubes that have end fittings secured thereto. The end fittings are covered with plastic to prevent damage or contamination to them when they are being packaged and shipped.

It has been known to wrap the end fittings with plastic wrap or the like to protect them. The plastic wrap, however, must be somehow secured to the fitting or it will unintentionally fall off. It has also been known to heat shrink plastic sleeves or caps or capsules over the end fittings to protect them. While this may be effective, there may be difficulties involved in maintaining the end of the fitting in place in the sleeve when the sleeve is being heat shrunk. If not properly aligned, the sleeve may not properly protect the end fitting.

There is, therefore, a need for a system for easily and effectively covering and protecting tube or hose end fittings when they are not in use.

SUMMARY OF THE INVENTION

The present invention is designed to overcome the deficiencies of the prior art discussed above. It is an object of the present invention to provide a system that is designed to protect end fittings of tube or hoses.

It is another object of the present invention to provide such a system that is easy to install and that is very accurate and effective.

In accordance with the illustrative embodiments demonstrating features and advantages of the present invention, there is provided a system or method of protecting the end fittings of a tube or hose that includes providing a heat shrinkable plastic capsule having a tubular portion with an open end and a closed end. Placing the plastic capsule over the end fitting until the closed end of the capsule is in contact with end of the fitting. Placing a magnet at the outer face of the capsule to maintain the end of the capsule in contact with the end of the fitting and heat shrinking the capsule onto the fitting. Finally, the magnet is removed from the end of the capsule and fitting.

Other objects, features, and advantages of the invention will be readily apparent from the following detailed description of the preferred embodiment thereof taken in conjunction with the drawings.

DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
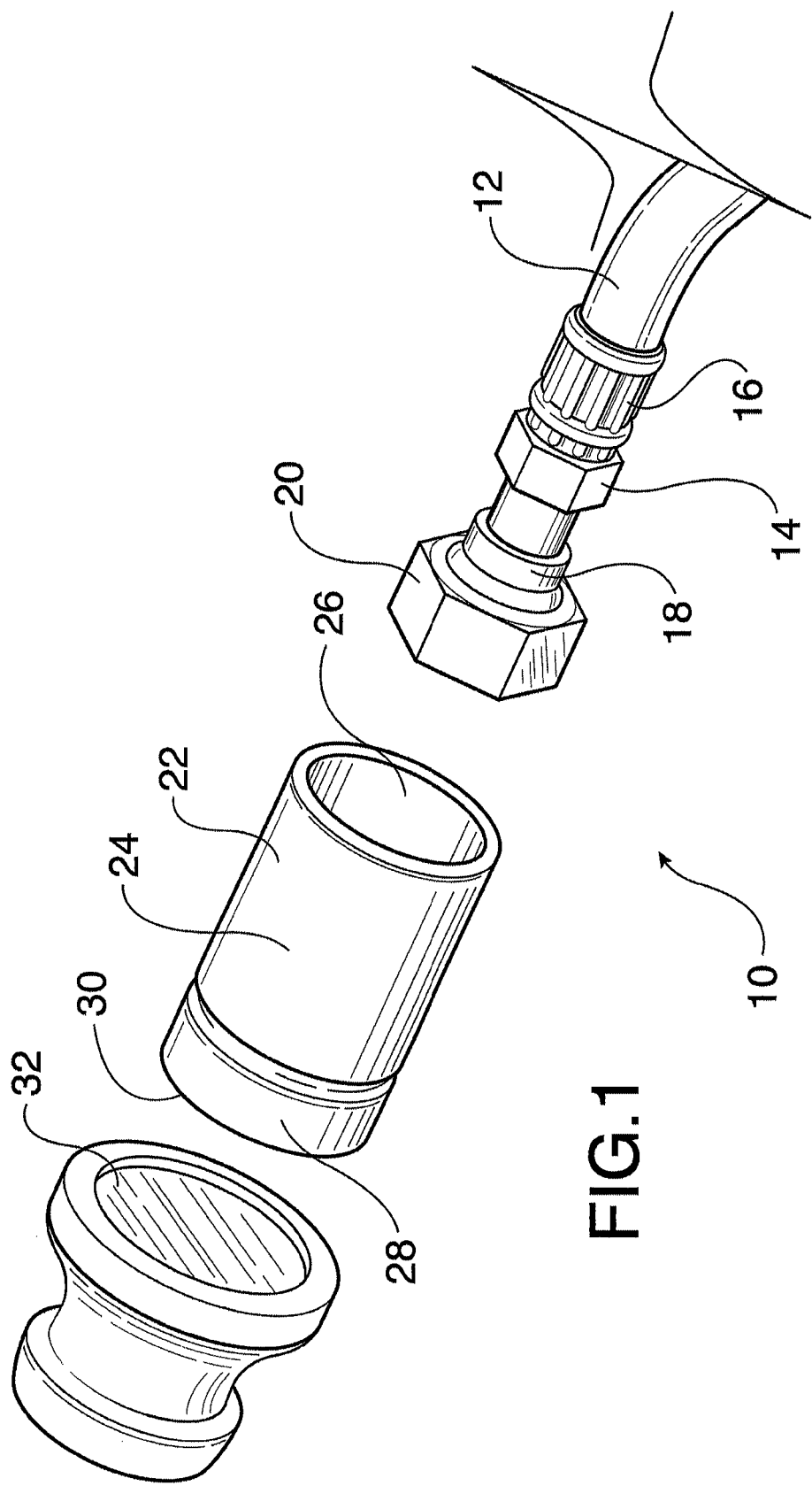
FIG. 1 is a front perspective view of the system of the invention showing the various parts thereof.
Figure 2:
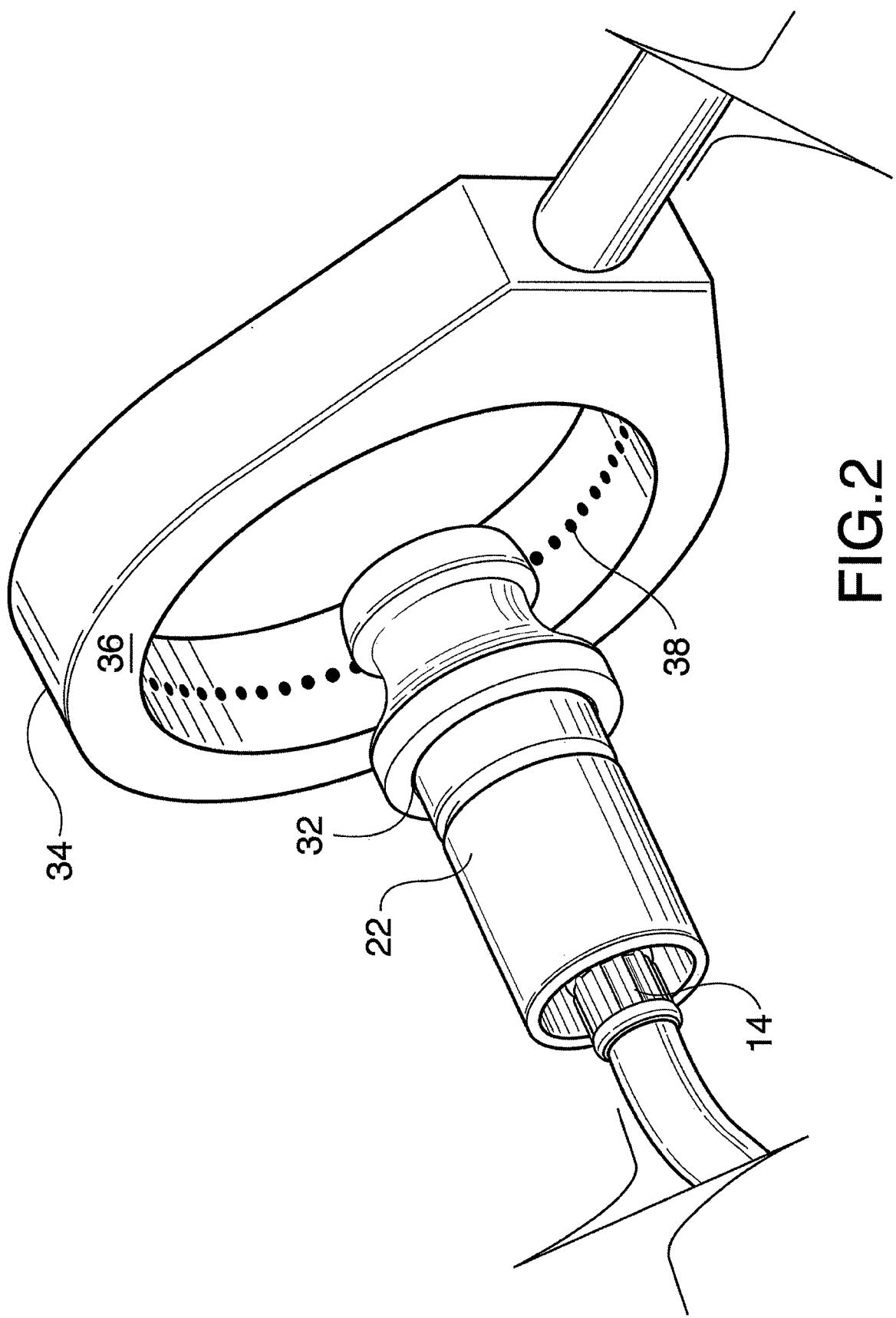
FIG. 2 is a perspective view of the invention showing a shrink wrapping operation.
Figure 3:
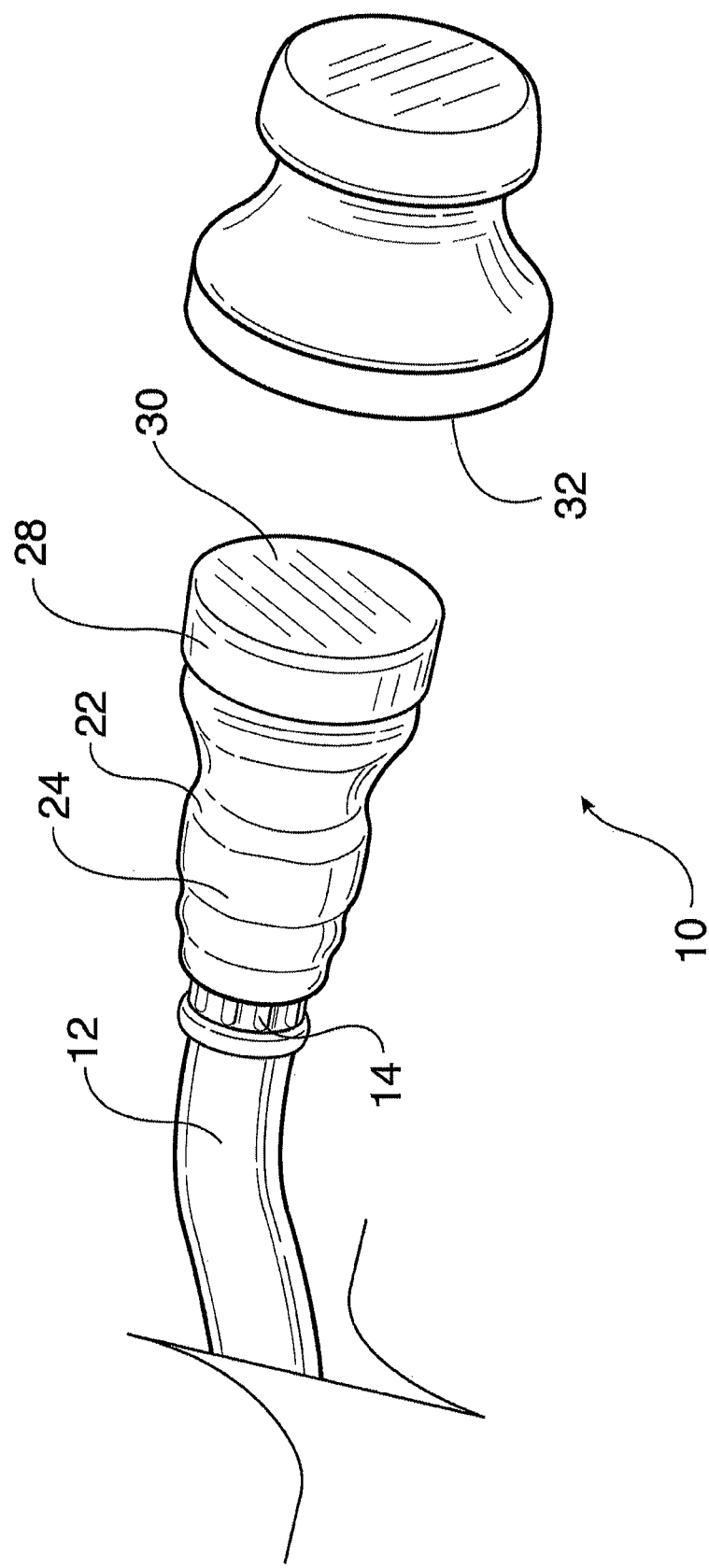
FIG. 3 is a perspective view showing the final shrink wrapped end fitting.

Referring now to the drawings in detail wherein like reference numerals have been used throughout the various figures to designate like elements, there is shown in FIGS. 1 and 2 a system for protecting the end fittings of tubes or hoses in accordance with the principles of the present invention and designated generally as 10. The system 10 is comprised essentially of providing a hose or tube 12 with an end fitting 14 attached thereto. The end fitting 14 includes a first end 16 that is secured to the hose or tube 12 and a free distal end 18. As is well known in the art, the distal free end 18 is frequently comprised of a nut 20 made from a magnetic material that is loosely attached to the remaining parts of the end fitting 14 and free to move somewhat backward. In use, the nut 20 is adapted to attach the end fitting 14 to an apparatus or piece of equipment. The term magnetic material, as used herein, refers to ferromagnetic materials and any material that can be attracted to a magnet. By way of example, this includes iron, steel, nickel, cobalt and various alloys thereof.

The system also includes a plastic capsule 22 which is made, in part, from a heat shrinkable plastic material. The capsule 22 includes a substantially tubular portion 24 with a first open end 26 and a closed free end 28. At least the tubular portion is made from the heat shrinkable plastic material. The closed free end 28 has an exterior face 30. The closed free end 28 may be made of a non-heat shrinkable plastic.

As can be seen in the drawings, the inside diameter of the tubular portion 24 is larger than the diameter of the nut 20 that forms the end of the end fitting 14. As a result, the plastic capsule 22 can be placed over the nut 20 and the distal end 18 of the end fitting 14. Before the end fitting 14 with the capsule 22 placed thereon is heated to shrink the plastic capsule, there must be assurance that the nut 20 (the distal free end 18) is properly positioned within the capsule 22. This is accomplished by placing a magnet 32 on the exterior face 30 of the capsule 22. The magnet 32 ensures that the distal free end 18 of the end fitting 14, i.e. the nut 20 is against the closed end 28 of the capsule 22.

With the magnet 32 at the end of the capsule 22, the end fitting 14 and capsule 22 are subjected to heat to heat shrink the plastic capsule 22 onto the end fitting to protect the same. Thereafter, the magnet 32 is removed. While substantially any magnet of proper size and strength could be used, it is preferred to utilize neodymium magnets embedded into the face of a puck-shaped heat resistant plastic that may be injection molded. It should be noted that the magnet 32 not only serves to hold the nut 20 against the inside closed end 28 of the capsule 22, it also protects the exterior face 30 and the plastic around it from overheating during the heat shrinking process when the end fitting an capsule are placed in the heating system.

While substantially any heating system could possibly be used, the preferred form of heating is through the use of a heat knife 34 such as shown in FIG. 2. The heat knife is in the form of an annular aluminum frame 36 having a plurality of inwardly facing apertures 38. Hot air from a hot air gun or other source is supplied to the aluminum frame 36 and is directed toward the center of the frame where the capsule 22 and end fitting 14 are placed to heat shrink the plastic capsule 22.

The present invention may be embodied in other specific forms without departing from the spirit or essential attributes thereof and accordingly, reference should be made to the appended claims rather than to the foregoing specification as indicating the scope of the invention.

The invention claimed is:

1. A method of protecting the end fittings of a tube or hose comprising the steps of:

providing an end fitting that is attached to a hose or tube, said end fitting have a first end connected to said tube or hose and a distal free end;

providing a plastic capsule, said capsule having a tubular portion with a first open end and a second closed free end, said closed free end having an exterior face, said capsule being made of a heat shrinkable plastic material and the tubular portion having a diameter larger than the diameter of said end fitting;

placing said plastic capsule over said end fitting until said closed end of said capsule is in contact with said distal end of said fitting, and subjecting said capsule to heat so as to heat shrink said capsule to tightly encompass at least a portion of said fitting while using a magnet to maintain said distal free end of said fitting against said closed end of said capsule.

2. The method of protecting the end fittings of a tube or hose as claimed in claim 1 wherein said distal end of said end fitting is constructed, at least in part, of a magnetic material.

3. The method of protecting the end fittings of a tube or hose as claimed in claim 2 wherein said step of maintaining said distal free end of said fitting against said closed end of said capsule includes the step of placing a magnet against said exterior face of said capsule.

4. The method of protecting the end fittings of a tube or hose as claimed in claim 3 including the further step of removing said magnet after said capsule has been heat shrunk onto said end fitting.

\* \* \* \* \*